United States Patent [19]

Guidotti

[11] 4,242,312

[45] Dec. 30, 1980

[54] REMOVAL OF SODIUM SULFATE FROM A SULFATE-CONTAINING SODIUM CHLORIDE SOLUTION IN A PROCESS FOR SEPARATING ZIRCONIUM AND HAFNIUM

[75] Inventor: Ronald A. Guidotti, Butte, Mont.

[73] Assignee: The United States of America as represented by the Secretary of the Interior, Washington, D.C.

[21] Appl. No.: 64,608

[22] Filed: Aug. 7, 1979

[51] Int. Cl.$^3$ .................... C01G 23/00; C01D 15/06
[52] U.S. Cl. ....................... 423/73; 423/70; 423/552
[58] Field of Search .................. 423/70, 73, 82, 197, 423/199, 551, 552

[56] References Cited

U.S. PATENT DOCUMENTS

| | | | |
|---|---|---|---|
| 2,892,681 | 6/1959 | Crandall | 423/70 |
| 3,331,661 | 7/1967 | Boiston et al. | 423/551 |
| 3,658,466 | 4/1972 | Otsuka | 423/70 |
| 3,928,535 | 12/1975 | Schulz | 423/551 |
| 4,104,365 | 8/1978 | Howard et al. | 423/551 |

FOREIGN PATENT DOCUMENTS

| | | | |
|---|---|---|---|
| 48-79711 | 10/1973 | Japan | 423/70 |
| 288880 | 3/1971 | U.S.S.R. | 423/551 |

Primary Examiner—O. R. Vertiz
Assistant Examiner—Gary P. Straub
Attorney, Agent, or Firm—William S. Brown; Donald A. Gardiner

[57] ABSTRACT

There is disclosed, in a process for separating zirconium and hafnium, an improvement for the removal of sodium sulfate from a sulfate-containing sodium chloride solution. This improvement includes adding a water-miscible organic precipitant such as methanol, ethanol or acetone to the sulfate-containing sodium chloride solution. The precipitant is added in an amount sufficient to cause the removal of sulfate as sodium sulfate. The organic precipitant is removed and the substantially sulfate ion free sodium chloride solution is recycled. Also provided is a process for the recovery of sodium sulfate having a purity greater than 99.9%. This process includes the steps of adding a first amount of a water-miscible precipitant to a zirconium-loaded aqueous solution, this first amount being insufficient to produce sodium sulfate crystal formation, contacting the resulting solution of the prior step with a zirconium-precipitating base to form a zirconium precipitate, passing the resulting treatment mixture to a separation stage from which there is obtained the zirconium precipitant and the sodium sulfate-containing sodium chloride solution, and adding a second amount of the precipitant to this sodium sulfate-containing sodium chloride solution whereby sodium sulfate crystals are formed.

10 Claims, 6 Drawing Figures

REMOVAL OF SODIUM SULFATE FROM A SULFATE-CONTAINING SODIUM CHLORIDE SOLUTION IN A PROCESS FOR SEPARATING ZIRCONIUM AND HAFNIUM

TECHNICAL FIELD

This invention relates to the removal of sodium sulfate in a process for separating zirconium and hafnium, and relates in one embodiment to the recovery of sodium sulfate having a purity greater than 99.9%.

BACKGROUND ART

It is known to remove sodium sulfate from a sulfate-containing sodium chloride solution by various techniques. Illustrative of this type of prior art are U.S. Pat. Nos. 3,712,797 to Winkler and 2,125,624 to Davis et al. Davis et al chill natural brine to about 30° F. to precipitate sodium sulfate in a relatively pure state. Included in these type of techniques are direct evaporation of brine to concentrate the brine followed by sodium sulfate removal by precipitation. This latter type of process requires either large storage areas to pool the brine for solar evaporation, as well as a long amount of time, or requires a tremendous expenditure of energy to produce the heat necessary for evaporative concentration.

The relative solubility of sodium sulfate and sodium chloride has been investigated to some extent in the prior art. The Davis et al and Winkler patents, discussed above, show this type of art. Winkler reports at column 1, lines 59–63, that the solubility behaviours of sodium chloride and sodium sulfate vary inversely with fluctuating temperature, that is, with increasing temperature, sodium chloride solubility rises and sodium sulfate solubility falls; whereas with decreasing temperature, sodium chloride solubility falls and sodium sulfate solubility rises.

The use of a precipitating agent such as methanol to recover sodium sulfate from a sulfuric acid solution containing sodium sulfate is known. U.S. Pat. No. 873,070 to Nibelius is illustrative thereof. It is also known to recover anhydrous sodium sulfate by the addition of a precipitating agent such as methanol to a saturated solution of sodium sulfate. U.S. Pat. No. 2,482,830 to Allen, Jr., is exemplary of this type of prior art process. Furthermore, it is known to recover anhydrous sodium sulfate by the addition of methanol to a sulfuric acid solution of sodium sulfate. Illustrative of this type of prior art is U.S. Pat. No. 3,331,661 to Boiston et al.

Other prior art showing the use of aqueous methanol to cause crystallization of sodium sulfate is exemplified by U.S. Pat. No. 3,597,168 to Hoppe et al. This patent uses the methanol to produce large grain crystals of sodium sulfate from a saturated aqueous solution of sodium sulfate.

It is also known in the prior art to add methanol to sea water brine having a specific gravity of about 1.31 so as to separate potassium sulfate and magnesium sulfate as a double salt. U.S. Pat. No. 3,925,028 to Lozano is representative. In this process, some sodium sulfate precipitates along with the potassium and magnesium sulfate. Lozano provides an about 72 volume percent concentration of methanol in the brine-methanol mixture.

This prior art and the other prior art of which we are aware is deficient because it fails to provide an energy efficient process for removing sulfate ion from an aqueous sodium chloride solution, in a process for separating zirconium and hafnium; because it fails to provide a process for recovering sodium sulfate having a purity greater than 99.9% from a sulfate ion-containing sodium chloride solution produced as a waste product in a process for separating zirconium and hafnium; and because it fails to provide a combination process that is energy efficient with regard to removing sulfate ion and that provides at the same time sodium sulfate of greater than 99.9% purity, in a process for separating zirconium and hafnium.

DISCLOSURE OF THE INVENTION

It is accordingly one object of the present invention to provide an energy efficient process for removing sulfate ion from an aqueous sodium chloride solution, in a process for separating zirconium and hafnium.

A further object of the present invention is to provide a process for recovering sodium sulfate having a purity greater than 99.9% from a sulfate ion-containing sodium chloride solution produced as a waste product in a process for separating zirconium and hafnium.

An additional object is to provide a combination process that is energy efficient with regard to removing sulfate ion from an aqueous sodium chloride solution and that provides at the same time sodium sulfate of greater than 99.9% purity, in a process for separating zirconium and hafnium.

Other objects and advantages of the present invention will become apparent as the description thereof proceeds.

In satisfaction of the foregoing objects and advantages, there is provided an improvement in a process for separating zirconium and hafnium. The zirconium and hafnium separation process includes the steps of extracting an aqueous sulfuric acid solution containing zirconium and hafnium ions with an organic extracting solution to produce a zirconium-loaded organic solution; contacting the zirconium-loaded organic solution with an aqueous sodium chloride solution to produce a zirconium-loaded aqueous solution; contacting the zirconium-loaded aqueous solution with a zirconium-precipitating base to form a zirconium precipitate; passing the resulting treatment mixture to a separation stage from which there is obtained the zirconium precipitate and sodium sulfate-containing sodium chloride solution; separating sodium sulfate from the sodium sulfate-containing sodium chloride solution; and recycling the resulting aqueous sodium chloride solution to strip zirconium. The improvement in this process includes the steps of (a) adding a water-miscible organic precipitant to the sodium sulfate-containing sodium chloride solution, the precipitant being added in an amount sufficient to provide a concentration of precipitant ranging from about 26 up to about 60 volume percent, whereby sodium sulfate crystals are formed, and the precipitant being either an alcohol having from 1 to 3 carbon atoms or a ketone having 2 or 3 carbon atoms; and (b) removing the precipitant prior to recycling the resulting aqueous sodium chloride solution to strip zirconium.

Also provided by the present invention is a process for recovering sodium sulfate having a purity greater than 99.9% from a sodium sulfate-containing sodium chloride solution. This process includes the steps of (a) adding a first amount of water-miscible precipitant to a zirconium-loaded aqueous solution, this first amount being insufficient to produce sodium sulfate crystal formation, the precipitant being either an alcohol having from 1 to 3 carbon atoms or a ketone having 2 or 3 carbon atoms, and the zirconium-loaded aqueous solution being produced by a zirconium and hafnium separation process that includes extracting an aqueous sulfuric acid solution containing zirconium and hafnium ions with an organic extracting solution to produce a zirconium-loaded organic solution, and then contacting the zirconium-loaded organic solution with an aqueous sodium chloride solution to produce the zirconium-loaded aqueous solution; (b) contacting the precipitant-containing, zirconium-loaded aqueous solution of the prior step with a zirconium-precipitating base to form a zirconium precipitate; (c) passing the resultant treatment mixture to a separation stage from which there is obtained the zirconium precipitate and a sodium sulfate-containing sodium chloride solution; (d) adding a second amount of the precipitant to the sodium sulfate-containing sodium chloride solution to provide a concentration of the precipitant ranging from about 50 to 53 volume percent, whereby sodium sulfate crystals are formed; and (e) recovering the high purity sodium sulfate.

BEST MODE FOR CARRYING OUT THE INVENTION

Figure 1:
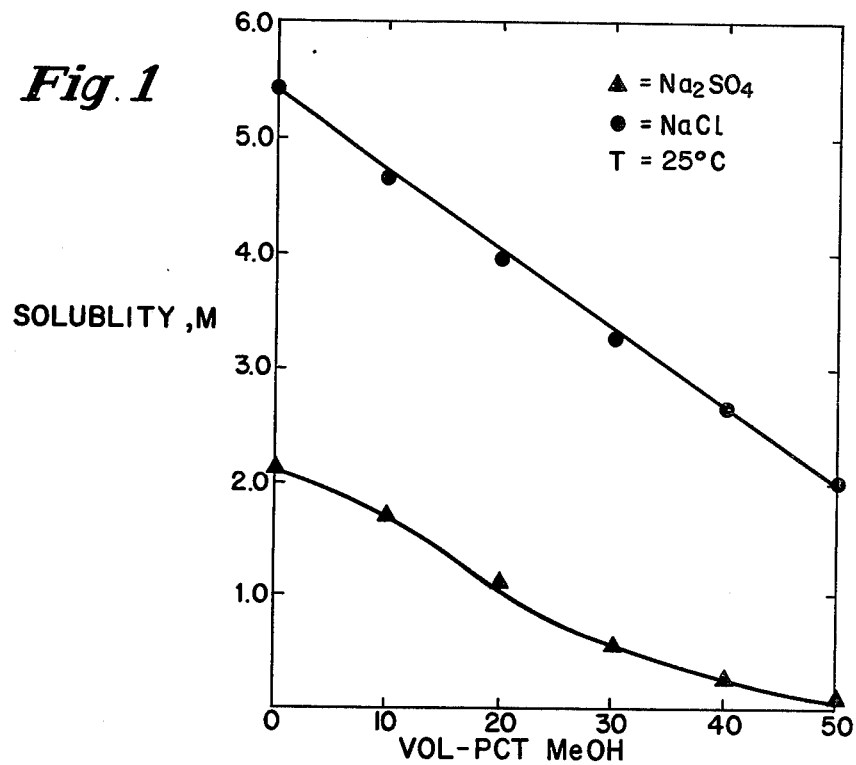
FIG. 1 shows the solubility of sodium chloride and sodium sulfate in methanol solutions.

As discussed above, the present invention is concerned with an improvement for sodium sulfate removal in a process for separating zirconium and hafnium and is concerned with the recovery of sodium sulfate having a purity greater than 99.9%. The type of zirconium and hafnium separation process in which the present invention is useful is illustrated by the process of K. Ishimatsu and H. Miyazaki, "Recovery of Zirconium in Separation of Zirconium and Hafnium," which is disclosed in Japan. Kokai 73 79,711 (Oct. 25, 1973), and in *Chemical Abstracts* 80 136104w (1974), the disclosures of which are hereby incorporated by reference into this application. In the process of Ishimatsu et al and in the process of U.S. Pat. No. 3,658,466, an organic extracting solution is used to extract zirconium from an aqueous sulfuric acid solution containing zirconium and hafnium ions. The portion of the disclosure of U.S. Pat. No. 3,658,466 relating to the use of the organic extracting solution thereof is hereby incorporated by reference into this application.

The zirconium-loaded organic solution is then contacted with an aqueous chloride ion-containing solution to produce a zirconium-loaded aqueous solution. Ishimatsu et al use LiCl, NaCl, KCl, $MgCl_2$ and $NH_4Cl$ to provide the chloride ion to this solution. Sodium chloride is particularly suitable due to its availability and low cost. Thus, the present invention is directed to an improvement in a process of the type exemplified by Ishimatsu et al in which sodium chloride is used as the chloride ion source, and is directed to sodium sulfate recovery where sodium chloride is used as the chloride ion source.

The zirconium-loaded aqueous solution is contacted with a zirconium-precipitating base such as sodium hydroxide or ammonia to form a zirconium precipitate. The resulting treatment mixture, which has a pH of from about 4 to 10, is then passed to a separation stage from which there is obtained the zirconium precipitate and a sodium sulfate-containing sodium chloride solution. Sodium sulfate is separated from the solution, and the resulting aqueous sodium chloride solution is recycled to strip zirconium after removal of the organic precipitant. Precipitant removal is accomplished conventionally as by distillation.

In this type of process, sulfate ion passes into the organic extracting solution, and from there into the zirconium-loaded aqueous solution. Thus, after the zirconium precipitate is removed, there remains a sodium sulfate-containing sodium chloride solution. In the present invention, there is added to this sodium chloride solution, a water-miscible organic precipitant that causes sulfate removal as sodium sulfate.

The organic precipitant is added in an amount sufficient to provide a concentration of precipitant ranging from about 26 up to about 60 volume percent. This concentration range results in about 30 to 96% removal of sulfate. It is preferred that the precipitant provides a concentration of from about 40 to 58 volume percent, as this results in from about 50-96% sulfate removal. It is even more preferred that the precipitant be added in an amount that provides a concentration of from about 50 to 55 volume percent, since from about 80-96% sulfate is removed. Precipitant addition is carried out at ambient temperature and pressure.

Figure 5:
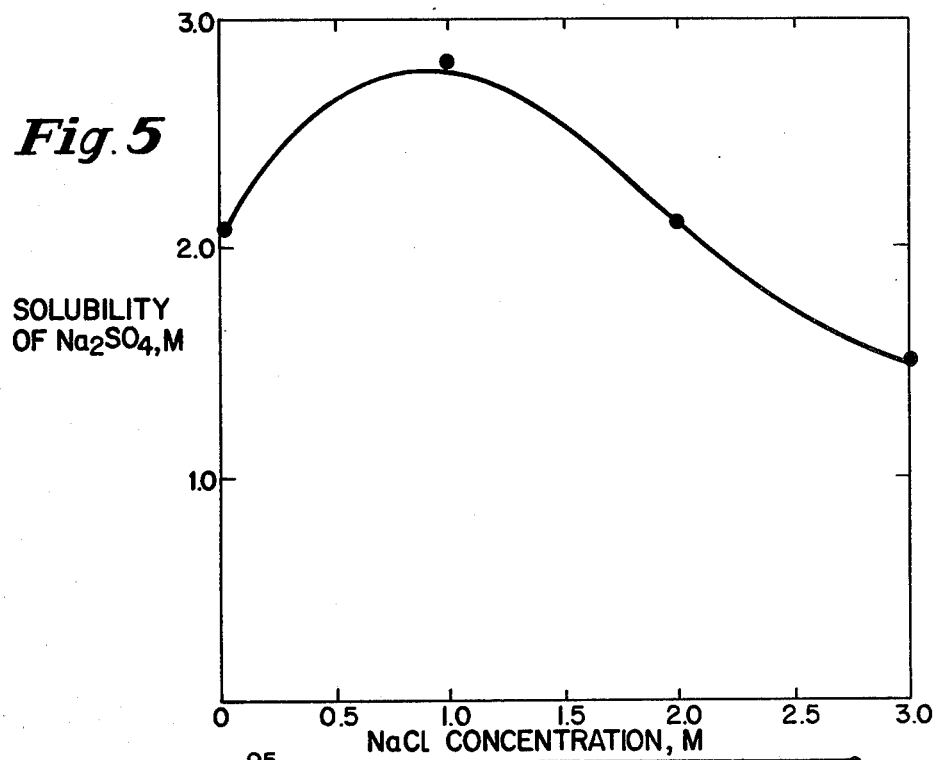
FIG. 5 shows the solubility of sodium sulfate in sodium chloride solutions.
Figure 6:
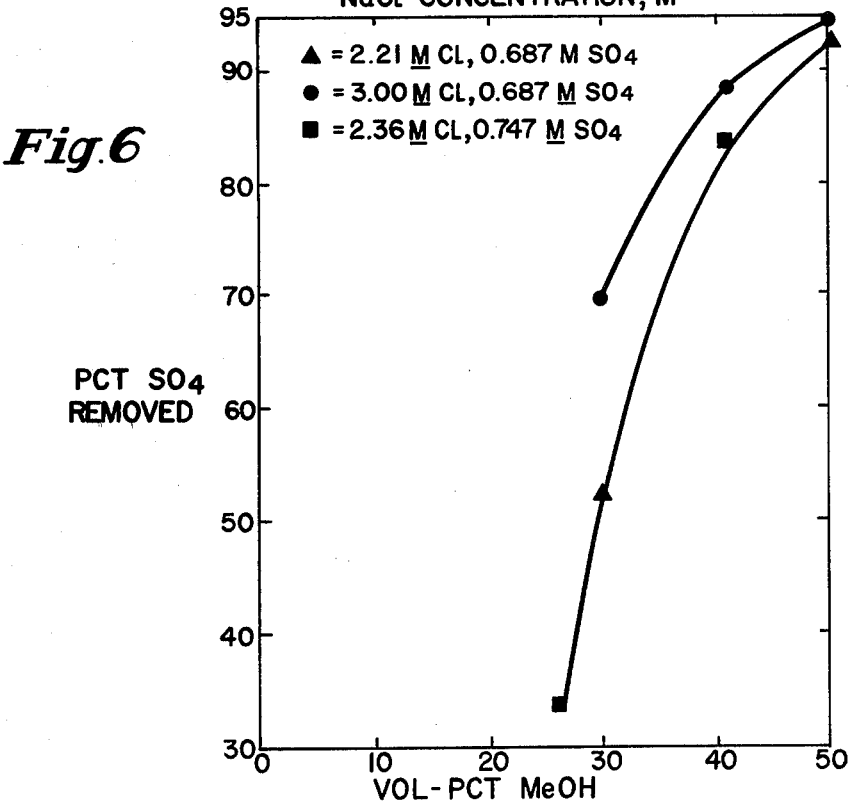
FIG. 6 shows the effect of sodium chloride concentration upon sodium sulfate recovery by methanol addition.

The percent sulfate removal is improved by increasing the concentration of chloride ion to about 3.0 M in the sulfate-containing sodium chloride solution, prior to adding precipitant. The solubility of sodium sulfate in sodium chloride solutions ranging up to 3.0 M is depicted in FIG. 5. An increase in chloride ion concentration is suitably achieved by adding sodium chloride to this sodium chloride solution. As illustrated by FIG. 6, the most significant improvement is at lower concentrations of precipitant, that is, in the general area of about 30 volume percent. As can be seen from this Figure, the concentration of precipitant required to remove a certain percent of sulfate is substantially decreased, particularly in the lower concentration range.

In one embodiment, the precipitant is added essentially all at once to the sulfate-containing sodium chloride solution. When a concentration of about 50 to 55 volume percent precipitant is provided, there results about 86-95% removal of sulfate as sodium sulfate, and the sodium sulfate has greater than 99% purity.

Figure 4:
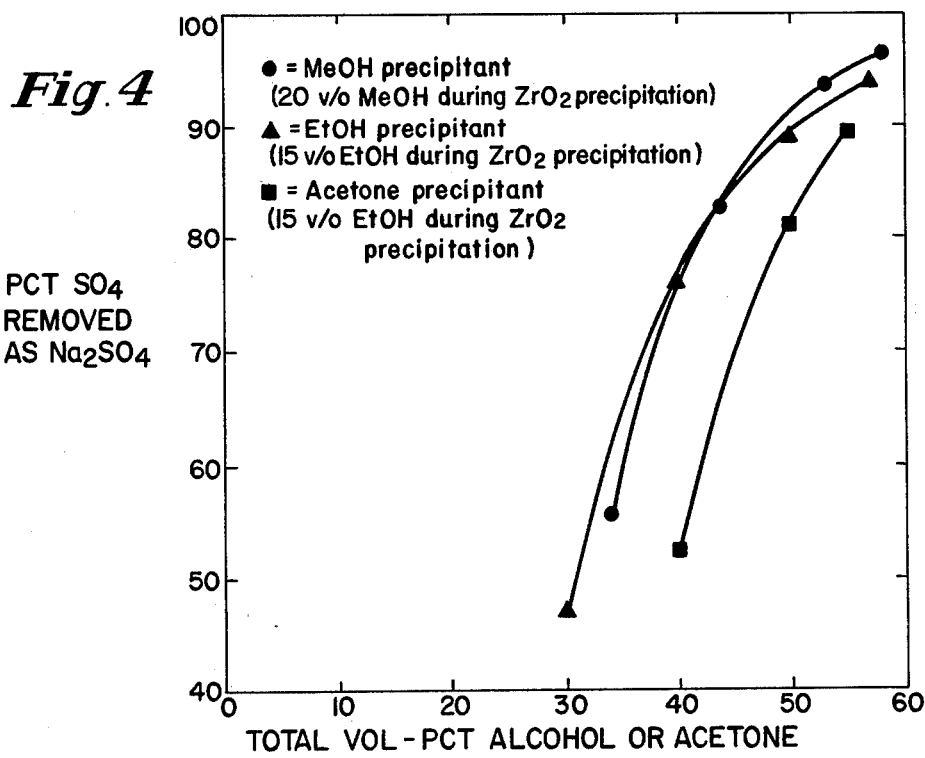
FIG. 4 shows sodium sulfate precipitation from barren sodium chloride strip liquor containing alcohol or ketone.

Alternatively, a portion of the precipitant is added to the zirconium-loaded aqueous solution prior to contacting this solution with the zirconium-precipitating base. The results of carrying out this alternative are graphically shown in FIG. 4. The amount of precipitant added is less than the amount that produces sodium sulfate crystal formation. After this portion of the precipitant is added, the zirconium-precipitating base is added, the zirconium precipitate is separated from the resulting treatment mixture leaving behind a precipitant-diluted, sodium sulfate-containing sodium chloride solution, and there is added to this solution sufficient additional precipitant to obtain a final concentration ranging from about 26 up to about 60 volume percent. Surprisingly, it has been discovered that when this alternative procedure is used to provide a final concentration of about 50 to 53 volume percent precipitant, there is recovered sodium sulfate having a purity in excess of about 99.9%.

When methanol is used to provide the portion of precipitant, methanol is added to the zirconium-loaded aqueous solution to provide up to an about 24 volume percent concentration of methanol. When ethanol is used, it is added to this zirconium-containing solution to provide up to an about 15 volume percent concentration of ethanol. When acetone is used, it is added to this zirconium-containing solution to provide up to an about 20 volume percent concentration of acetone.

Figure 2:
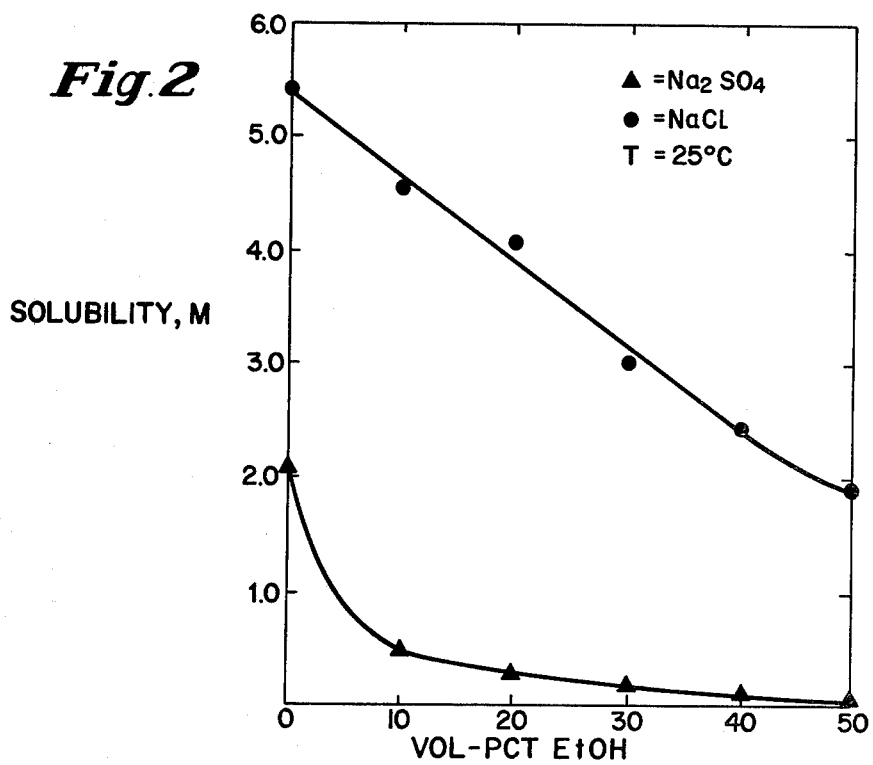
FIG. 2 shows the solubility of sodium chloride and sodium sulfate in ethanol solutions.
Figure 3:
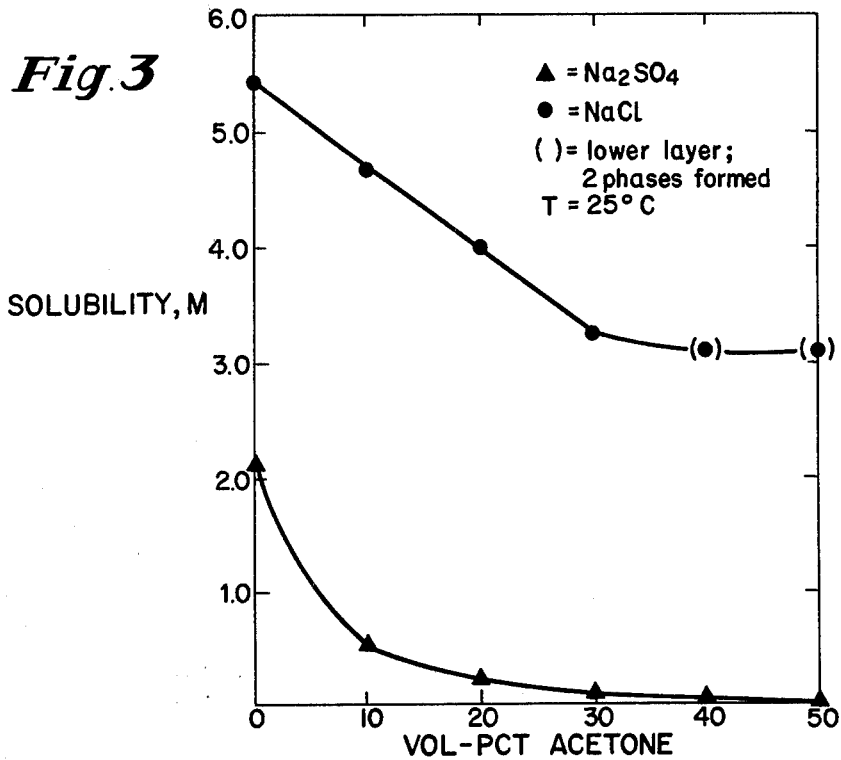
FIG. 3 shows the solubility of sodium chloride and sodium sulfate in acetone solutions.

The organic precipitant is an alcohol having from 1 to 3 carbon atoms or is a ketone having 2 or 3 carbon atoms. When the alcohol is selected as the precipitant, methanol or ethanol is preferred, and when the ketone is selected as the precipitant, acetone is preferred. FIGS. 1-3 depict solubility of sodium chloride and sodium sulfate in solutions of methanol, ethanol and acetone, respectively.

When the ketone is selected as the precipitant and the zirconium-precipitating base is ammonia, it is preferred to neutralize the free ammonia in the sodium sulfate-containing sodium chloride solution prior to adding the organic precipitant. This neutralization step prevents aldol-condensation reactions from occurring.

When acetone is used as the precipitant in an amount of about 40 volume percent or more, a second liquid phase forms in the sodium sulfate-containing sodium chloride solution. Crystals of sodium sulfate are deposited from the heavier phase, and crystal deposition is slower than with the alcohols. There is produced much larger crystals, but sulfate removal is lower. Thus, the alcohols are preferred unless, of course, there is a preference for the larger sodium sulfate crystals.

Specific examples of the present invention will now be set forth. It is to be understood that these examples are merely illustrative and are not in any way to be interpreted as limiting the scope of the invention. Unless otherwise indicated, all processing steps in these examples are carried out at ambient temperature and pressure.

EXAMPLE 1

A 3.0 M sodium chloride solution used to strip zirconium sulfate from an organic solution of tri-n-octylamine, decanol and kerosine is contacted with gaseous ammonia until all the zirconium is precipitated. The resulting mixture is passed to a separation stage from which there is obtained the zirconium precipitate and a sodium sulfate-containing aqueous sodium chloride solution. This sodium chloride solution contains 0.75 M sulfate ion and 2.36 M chloride ion. There is added to this solution an amount of methanol sufficient to provide a 26 volume percent concentration of methanol. Sodium sulfate crystals form and are removed by filtration. There results a 33% sulfate removal as sodium sulfate.

EXAMPLE 2

Following the procedure of Example 1, there is added to an identical sodium chloride solution a sufficient amount of methanol to provide a 32 volume percent concentration of methanol. 78% sulfate removal is obtained.

EXAMPLE 3

Following the procedure of Example 1, there is added to an identical sodium chloride solution an amount of methanol sufficient to provide a 40 volume percent concentration of methanol. 84% sulfate removal results.

EXAMPLE 4

The procedure of Example 1 is followed except that ethanol, rather than methanol, is used as the organic precipitant. A 36% sulfate removal is produced.

EXAMPLE 5

Following the procedure of Example 1, there is added to an identical sodium chloride solution, an amount of ethanol sufficient to provide a 30 volume percent concentration of ethanol. 60% sulfate removal is obtained.

EXAMPLE 6

Following the procedure of Example 1 except that a sodium chloride solution containing 0.68 M sulfate ion and 2.23 M chloride ion is used, there is added to this solution an amount of ethanol sufficient to provide a 50 volume percent concentration of ethanol. There results an 89% sulfate removal.

EXAMPLE 7

Following the procedure of Example 6, there is added an amount of ethanol sufficient to provide a 55 volume percent concentration of ethanol. As a result, 94% sulfate removal is produced, and the sodium sulfate has a purity greater than 99%.

EXAMPLE 8

Following the procedure of Example 6, there is added an amount of methanol sufficient to provide a 55 volume percent concentration of methanol. There results a 95% removal of sulfate, and the sodium sulfate has a purity greater than 99%.

EXAMPLE 9

Following the procedure of Example 6, there is added an amount of acetone sufficient to provide a 30 volume percent concentration of acetone. There results a 44% removal of sulfate.

EXAMPLE 10

Following the procedure of Example 6, there is added an amount of acetone sufficient to provide a 40 volume percent concentration of acetone. 73% sulfate removal results.

EXAMPLE 11

Following the procedure of Example 6, there is added an amount of acetone sufficient to provide a 50 volume percent concentration of acetone. 86% sulfate removal results. In this case, as in Example 10, there is formed a second liquid phase in the sodium chloride solution. The solution is gently agitated and the bulk of the sodium chloride crystals is deposited within less than one hour. The sodium sulfate crystals are deposited from the heavier liquid phase, and are relatively large. These crystals have a purity greater than 99%.

EXAMPLE 12

An aqueous sodium chloride solution used to remove zirconium sulfate from an organic solution of tri-n-octylamine, decanol and kerosine is diluted with methanol to provide a solution containing 20 volume percent methanol. This solution is contacted with gaseous ammonia until all the zirconium is precipitated. This occurs at a pH of 9.0. The resulting mixture is then passed to a separation stage from which there is obtained the zirconium precipitate and a sodium sulfate-containing sodium chloride solution. This sodium chloride solution contains 1.8 M chloride ion, 0.5 M sulfate ion, 2.6 M sodium ion and 0.3 M ammonium ion. There is added to this solution an additional amount of methanol to provide a solution containing 53 volume percent methanol. Sodium sulfate crystals form and are removed by filtration. There is obtained a 93% sulfate recovery as sodium sulfate, and the sodium sulfate has a purity greater than 99.9%.

EXAMPLE 13

Following the procedure of Example 12, except that ethanol is used as the precipitant rather than methanol, ethanol is added in an amount to provide a solution containing 15 volume percent ethanol prior to adding ammonia. Once the zirconium has been separated, an additional amount of ethanol is added to provide a 50 volume percent concentration of ethanol. There is obtained 89% sulfate removal, and the sodium sulfate has a purity greater than 99.9%.

EXAMPLE 14

Following the procedure of Example 13, except that acetone is used as the organic precipitant rather than ethanol, there is obtained 81% sulfate removal, and the sodium sulfate has a purity greater than 99.9%. In this Example, a second liquid phase forms in the sodium chloride solution, and the sodium sulfate crystals are deposited from the heavier liquid phase. These crystals are relatively large.

Industrial Applicability

This invention is useful for providing an aqueous sodium chloride solution that is substantially free of sulfate ion, for recycling in a process for separating zirconium and hafnium that uses an aqueous sodium chloride solution for stripping zirconium out of an organic extracting solution and into the aqueous sodium chloride solution. Additionally, this invention is useful in providing very high purity sodium sulfate, a commercially useful material.

I claim:

1. A process for separating zirconium and hafnium comprising (1) extracting an aqueous sulfuric acid solution containing zirconium and hafnium ions with an organic extracting solution to produce a zirconium-loaded organic solution; (2) contacting the zirconium-loaded organic solution with an aqueous sodium chloride solution to produce a zirconium-loaded aqueous solution; (3) adding a first amount of a water-miscible organic precipitant selected from the group consisting of an alcohol having from 1 to 3 carbon atoms or a ketone having 2 or 3 carbon atoms to the zirconium-loaded aqueous solution, said amount being less than the amount of said precipitant required to produce sodium sulfate crystal formation, (4) contacting the zirconium-loaded aqueous solution with a zirconium-precipitating base to form a zirconium precipitate; (5) passing the resulting treatment mixture to a separation stage from which there is obtained the zirconium precipitate and a sodium sulfate-containing sodium chloride solution; (6) adding a second amount of the water-miscible organic precipitant to the sodium sulfate-containing sodium chloride solution, the total amount of said precipitant being sufficient to provide a concentration of said organic precipitant ranging from about 26 up to about 60 volume percent, whereby sodium sulfate crystals are formed; (7) separating said sodium sulfate crystals from the sodium sulfate-containing sodium chloride solution; and (8) removing said organic precipitant prior to recycling the resulting aqueous sodium chloride solution to strip zirconium.

2. The process of claim 1 wherein said concentration ranges from about 40 to 58 volume percent.

3. The process of claim 2 wherein said concentration ranges from about 50 to 55 volume percent.

4. The process of claim 1 wherein said precipitant is methanol, and said organic first amount of precipitant provides up to about 24 volume percent concentration of methanol.

5. The process of claim 1 wherein said precipitant is ethanol, and said organic first amount of precipitant provides up to about 15 volume percent concentration of ethanol.

6. The process of claim 1 wherein said precipitant is acetone, and said organic first amount of precipitant provides up to about 20 volume percent concentration of acetone.

7. The process of claim 1 wherein said precipitant is said ketone.

8. The process of claim 7 wherein said ketone is acetone.

9. The process of claim 1 wherein said precipitant is said alcohol.

10. The process of claim 9 wherein said alcohol is methanol or ethanol.

* * * * *